M. WHEELER & E. M. BATES.
HEATING DEVICE.
APPLICATION FILED JUNE 18, 1918.

1,297,281.

Patented Mar. 11, 1919.
2 SHEETS—SHEET 1.

Inventors
Mary Wheeler &
Edith M. Bates
By Victor J. Evans
Attorney

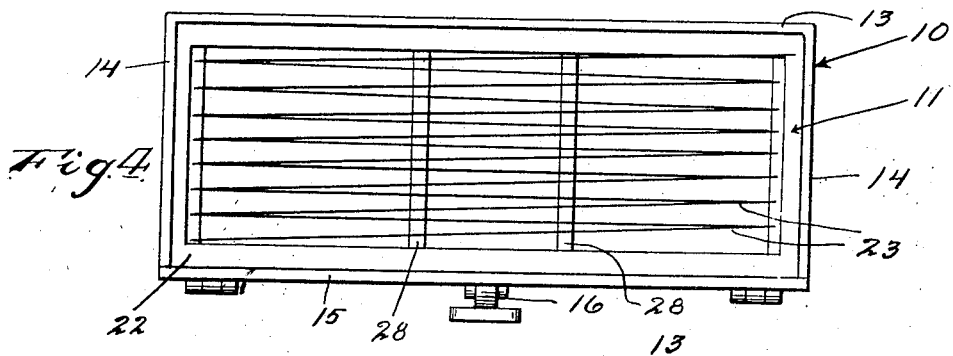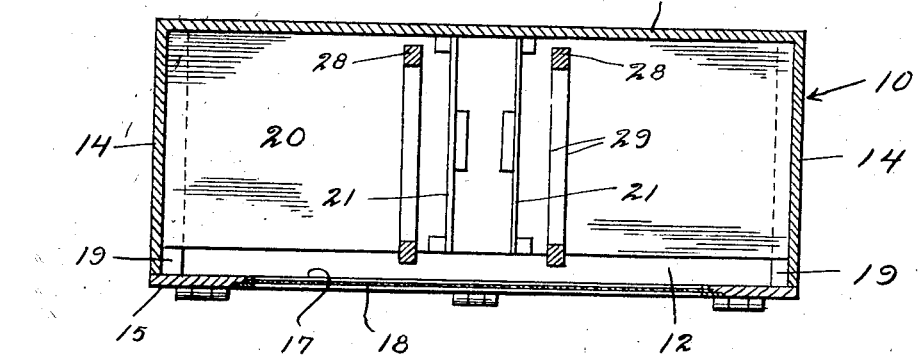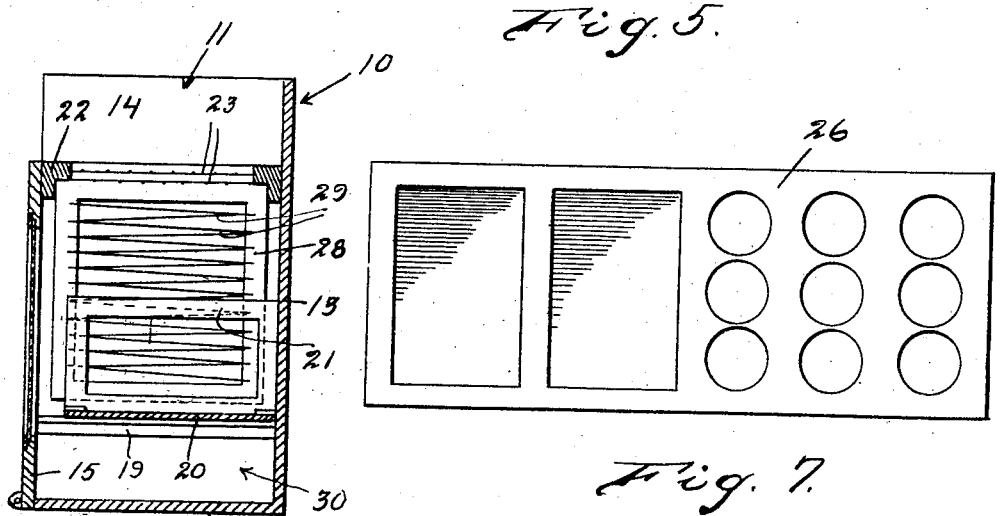

UNITED STATES PATENT OFFICE.

MARY WHEELER AND EDITH MAY BATES, OF LOS ANGELES, CALIFORNIA.

HEATING DEVICE.

1,297,281.      Specification of Letters Patent.      Patented Mar. 11, 1919.

Application filed June 18, 1918. Serial No. 240,617.

*To all whom it may concern:*

Be it known that we, MARY WHEELER and EDITH MAY BATES, citizens of the United States, residing at Los Angeles, in the county of Los Angeles and State of California, have invented new and useful Improvements in Heating Devices, of which the following is a specification.

This invention relates to heating devices, particularly to electrically operated cookers, and has for its object the provision of a simple electrically operated cooker, so constructed that bread may be quickly and effectively toasted therein, chops and the like broiled and vegetables and other articles cooked, and which is furthermore provided with certain compartments adapted for maintaining articles warm and in proper condition for use as food.

An important object is the provision of a cooker of this character in which one of the heating coil supporting frames is so formed that it will itself form a support for the pans in which the articles to be cooked are disposed.

Another object is the provision of a device of this character provided with a plurality of heating coils with which may be associated a specially constructed tray adapted to support slices of bread in a vertical position adjacent the coils so that the bread may be toasted evenly and efficiently.

An additional object is the provision of a device of this character in which several of the functions may be carried out at the same time.

A further object is the provision of a device of this character which will be extremely simple and inexpensive in manufacture, highly efficient and durable in use, and a general improvement of the art.

With the above and other objects and advantages in view, the invention consists in the details of construction and arrangement to be hereinafter more fully described and claimed, and illustrated in the accompanying drawings, in which:

Fig. 4 is a plan view with the upper pans removed

Fig. 5 is a horizontal sectional view

Fig. 6 is a cross sectional view and

Fig. 7 is a plan view of a tray which may be used for baking.

Figure 1:
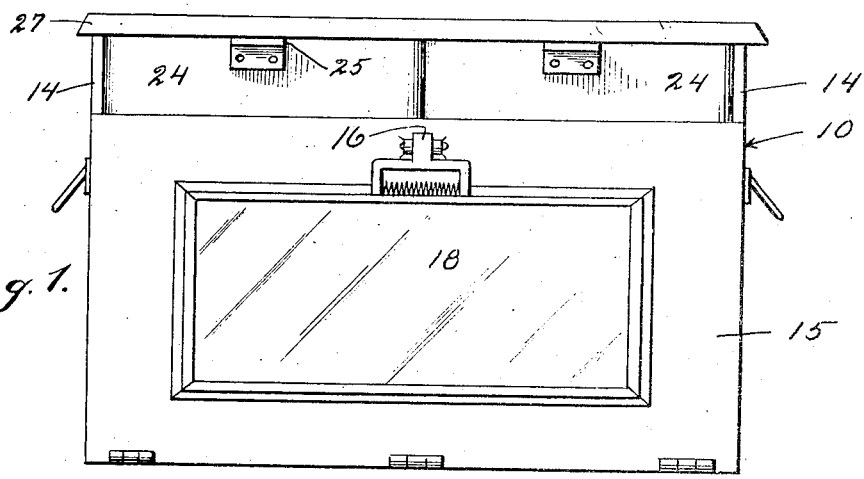
Figure 1 is a front elevation of the device with the front cover in place
Figure 2:
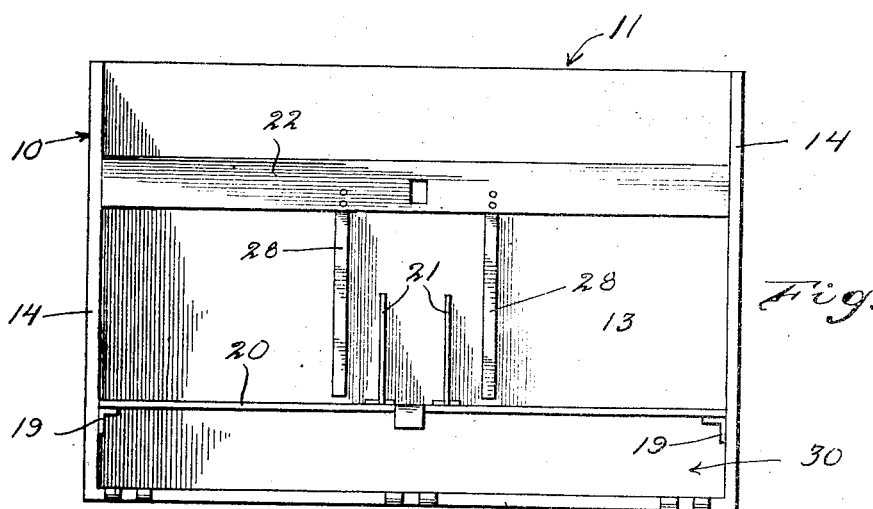
Fig. 2 is a similar view with the cover removed
Figure 3:
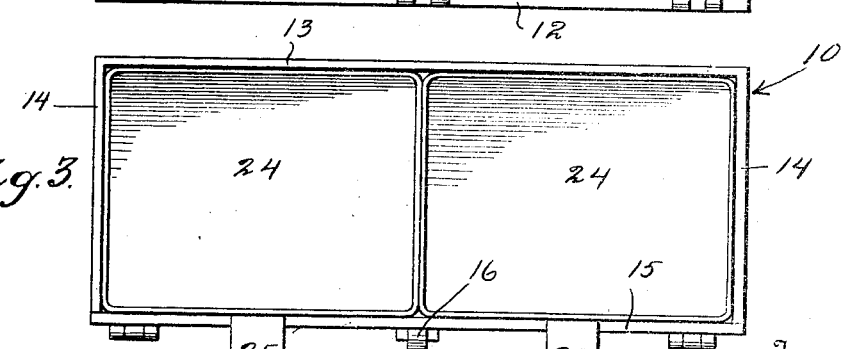
Fig. 3 is a plan view

Referring more particularly to the drawings, the numeral 10 designates the outer casing of the device which is formed preferably rectangular in shape and which has an open top 11, a bottom 12, a back wall 13 and end walls 14. The front of the casing is closed by a suitably hinged door 15 provided with any preferred catch 16. The door 15 is provided with an opening 17 covered by a sheet of mica or isinglass 18 through which the condition of articles disposed within the device may be ascertained from time to time. Secured upon the inner sides of the end walls 14 adjacent their lower portions are cleats 19 adapted to support a tray 20 which extends entirely across the interior of the casing and which is provided upon its top with a plurality of upright clip members 21 between which slices of bread to be toasted may be disposed.

Disposed within the casing 10 at a point spaced below the top edge thereof is a horizontally disposed frame 22 carrying convolutions 23 of resistance wire and serving as a heating member when electricity is passed through the wire. This frame 22 not only performs the function of supporting the convolutions of wire but also serves as a support for a plurality of pans 24 which are disposed thereupon and within which articles to be cooked are placed, the pans being provided with suitable lids or covers 25. In place of using the pans 24, we may prefer to use the pan or tray 26 shown in Fig. 7, this pan being provided with a plurality of depressions in which muffins or cakes may be baked. In the event that this pan is used, the top of the casing 10 is covered by a suitable plate 27 upon which a coffee pot or other receptacle may be placed. In view of the fact that the heating coil formed by the convolutions of wire upon the frame 22 might be insufficient to accomplish an efficient toasting of the bread carried by the tray 20, we provide auxiliary heating members which depend from the frame 22 and which comprise vertically disposed frames 28 carrying the convolutions 29 of resistance wire. These frames 28 are disposed at the sides of the clips 21 and will serve to produce a sufficiently intense heat very close to the slices of bread to be toasted so that the toasting action will be efficiently carried out. It will of course be understood that chops, steaks or other articles may be properly held between the clips 21 so that they may be broiled.

The provision of the horizontally disposed tray 20 divides the lower portion of the casing 10 into two compartments, the lower one of which, 30, will serve as a warming oven in which may be disposed dishes of food so that the food contained therein will be kept at the proper temperature to render it most fit for use.

It will be understood that the wire carried by the frame 22 may be connected in series with the wires carried by the frames 28 or that the different sets of wiring may be independently used, this detail forming no part of the present invention.

From the foregoing description and a study of the drawing it will be apparent that we have thus provided a very simple and efficient device whereby various cooking operations may be carried out at the same time, whereby food may be merely kept warm and whereby bread may be efficiently toasted.

Having thus described our invention we claim:—

1. An electric cooker comprising a casing, a horizontally disposed heating frame therein, said frame further serving as a support, a plurality of pans disposed upon said frame and filling the upper portion of the casing, a plurality of vertically disposed frames depending below said horizontal frame and carrying heating wires, a removable tray arranged horizontally within the casing below said second named frames, and a plurality of supporting members carried by said tray between said second named frames.

2. An electric cooker comprising a casing, a horizontally disposed heating frame secured adjacent the upper portion thereof and extending entirely thereacross, a plurality of vertically disposed heating frames depending below said horizontal frame, a tray removably secured within the casing adjacent the lower portion thereof and immediately below said vertical frames, and a plurality of supporting members carried by said tray and disposed between said vertical frames.

3. An electric cooker comprising a casing, a tray removably mounted within the lower portion of the casing and dividing the casing into two compartments, a horizontally disposed heating frame within the upper portion of the casing, a plurality of heating frames depending from said first named frame and terminating above said tray, and a plurality of supporting members carried by the tray and disposed between said second named frames.

In testimony whereof we affix our signatures.

MARY WHEELER.
EDITH MAY BATES.